Figure 1:
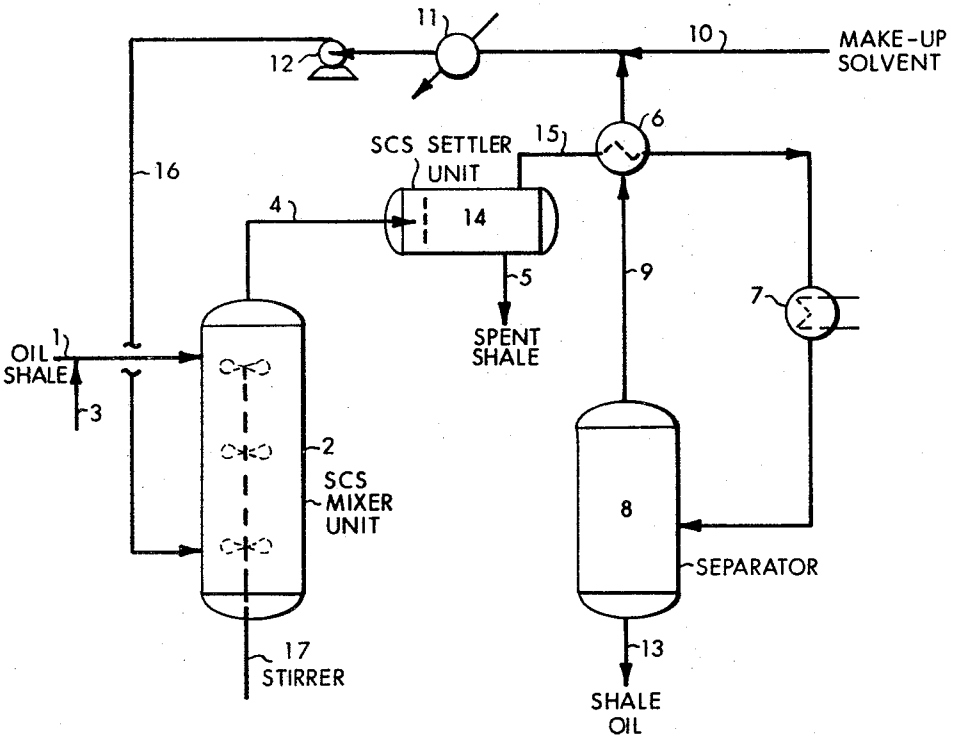
Figure 2:
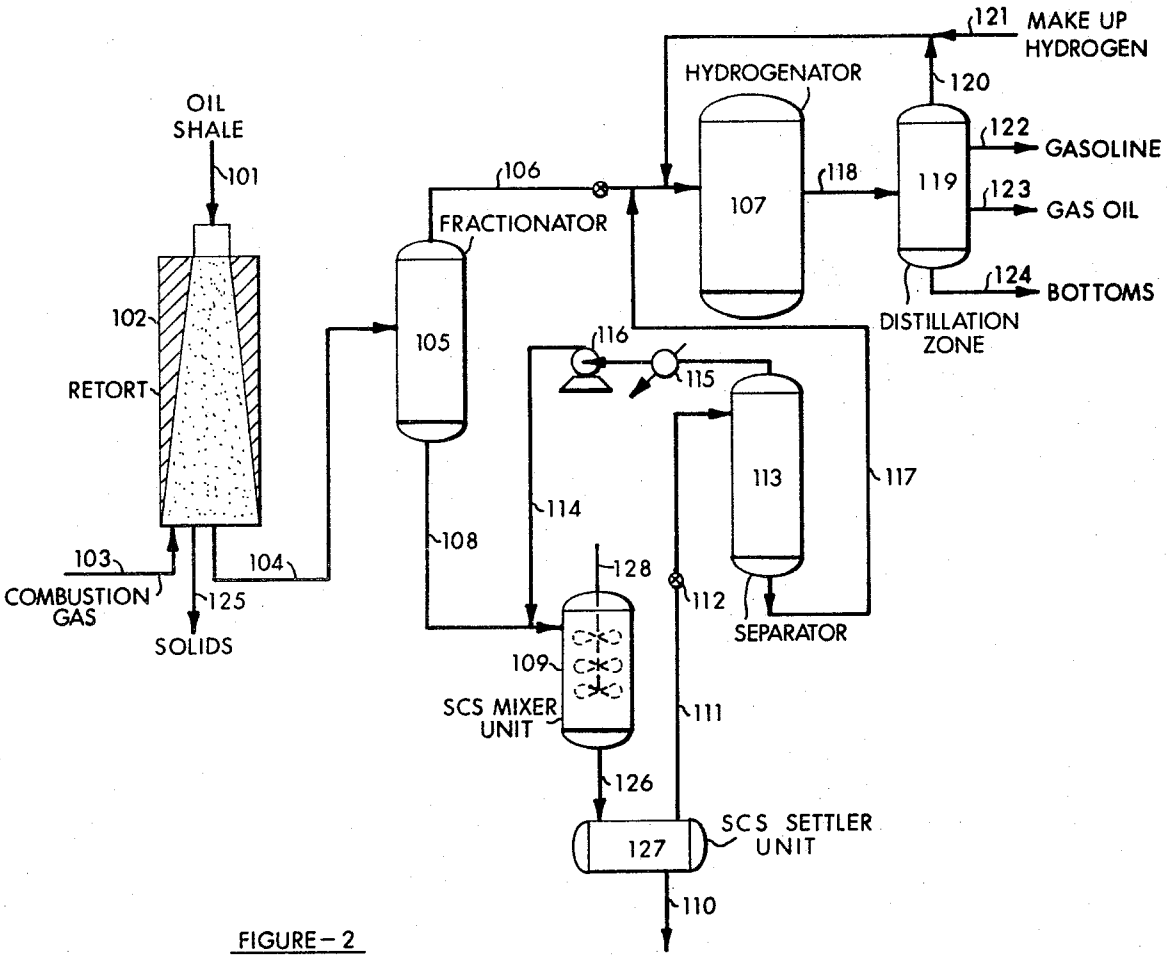

T861027

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 15, 1969

861 O.G. 703

700,489

CONTACTING OIL SHALE OR SHALE OIL WITH A SOLVENT TO PRODUCE MATERIAL SUITABLE FOR HYDROFINING

Robert B. Long, 249 E. Highland Ave., Atlantic Highlands, N.J. 07716, Herman J. Solomon, 40 Watson Ave., Apt. 24, Elizabeth, N.J. 07202, and Homer J. Hall, 310 Prospect Ave., Cranford, N.J. 07016

Filed Jan. 25, 1968. Published Apr. 15, 1969

Class 208—11

2 Sheets Drawing. 12 Pages Specification

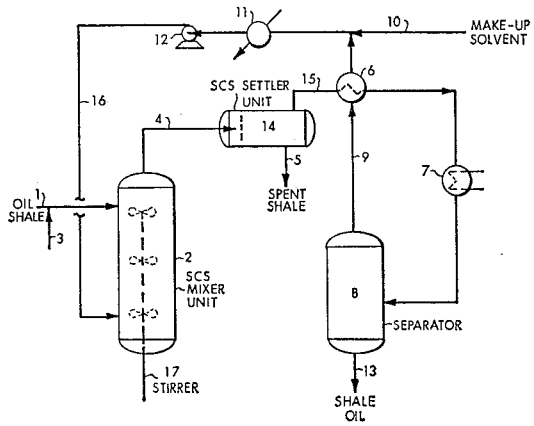

This disclosure relates to a process for refining oil shale or shale oil. In one embodiment, ground oil shale is extracted with a mixture of a polar and a non-polar solvent at supercritical conditions including a temperature in the range of 90–500° F. and a pressure in the range of 750–5000 p.s.i.a. to provide a shale oil extract phase. In another embodiment a fraction of shale oil from shale retorting is extracted with a non-polar solvent at supercritical conditions including a temperature in the range of 210–420° F. and a pressure in the range of 800–3500 p.s.i.a to provide a shale oil extract phase having a reduced content of heteroatomic compounds suitable for subsequent hydrofining. Optimum conditions for the supercritical separation step will depend upon the critical temperature of the solvent(s) and the molecular type distribution of the feed. Suitable non-polar solvents include ethane, propane, butane, pentane, hexane, ethylene, propylene, butylene, cyclohexane, benzene, decalin, tetralin, etc. Suitable polar solvents include ammonia, methyl amines, nitrous oxide, sulfur dioxide, methyl chloride, dimethyl ether, methyl alcohol, formaldehyde and acetone.

SN - 700489 T861027

April 15, 1969 R. B. LONG ET AL DEF. PUB.

CONTACTING OIL SHALE OR SHALE OIL WITH A SOLVENT TO PRODUCE MATERIAL SUITABLE FOR HYDROFINING

Filed Jan. 25, 1968 Sheet 1 of 2

R. B. LONG
H. J. SOLOMON
H. J. HALL
Inventors

By C. W. Grady Jr.
Patent Attorney

SN - 700489 T861027

April 15, 1969 R. B. LONG ET AL DEF. PUB.

CONTACTING OIL SHALE OR SHALE OIL WITH A SOLVENT TO PRODUCE MATERIAL SUITABLE FOR HYDROFINING

Filed Jan. 25, 1968 Sheet 2 of 2

R. B. LONG
H. J. SOLOMON Inventors
H. J. HALL

By C. W. Grady Jr.
Patent Attorney